US011625706B2

(12) United States Patent
Oberli et al.

(10) Patent No.: US 11,625,706 B2
(45) Date of Patent: Apr. 11, 2023

(54) SYSTEM AND METHOD FOR LOCATION-BASED PASSIVE PAYMENTS

(71) Applicant: Axon Vibe AG, Lucerne (CH)

(72) Inventors: Roman Oberli, Sarnen (CH); Thomas Annicq, New York, NY (US); Ryan Vilim, Brooklyn, NY (US); Simon Gelinas, Brooklyn, NY (US); David Foley, New York, NY (US)

(73) Assignee: AXON VIBE AG, Lucerne (CH)

( * ) Notice: Subject to any disclaimer, the term of this patent is extended or adjusted under 35 U.S.C. 154(b) by 743 days.

(21) Appl. No.: 15/337,428

(22) Filed: Oct. 28, 2016

(65) Prior Publication Data
US 2017/0124550 A1 May 4, 2017

Related U.S. Application Data

(60) Provisional application No. 62/247,997, filed on Oct. 29, 2015.

(51) Int. Cl.
G06Q 20/32 (2012.01)
G07B 15/02 (2011.01)
(Continued)

(52) U.S. Cl.
CPC ......... *G06Q 20/3224* (2013.01); *G06Q 50/30* (2013.01); *G07B 15/02* (2013.01);
(Continued)

(58) Field of Classification Search
None
See application file for complete search history.

(56) References Cited

U.S. PATENT DOCUMENTS

| 5,948,040 A * | 9/1999 | DeLorme ............. G09B 29/106 701/426 |
| 8,018,330 B2 | 9/2011 | Stoffelsma et al. |

(Continued)

FOREIGN PATENT DOCUMENTS

| CN | 104134367 A | 11/2014 |
| DE | 102007014528 | 10/2008 |

(Continued)

OTHER PUBLICATIONS

International Search Report and Written Opinion issued by the U.S. Patent and Trademark Office as International Searching Authority issued in PCT/US16/59328, dated Jan. 3, 2017 (8 pages).

(Continued)

*Primary Examiner* — Ayal I. Sharon
(74) *Attorney, Agent, or Firm* — Wilmer Cutler Pickering Hale and Dorr LLP

(57) ABSTRACT

Systems and methods for passively processing a payment for an activity that leverages location data of a user participating in the activity. User data is received, the user data including a plurality of user location points and a time associated with each of the plurality of user location points. An activity is determined, the activity associated with the user based on the user data, wherein the activity is associated with at least one of transportation and attendance at a venue. An instance of the activity is identified and a payment amount for the user is processed based on the instance of the activity.

20 Claims, 14 Drawing Sheets

(51) Int. Cl.
  *H04W 4/029*   (2018.01)
  *G06Q 50/30*   (2012.01)
  *H04L 67/52*   (2022.01)
  *H04L 67/50*   (2022.01)
  *H04L 67/561*  (2022.01)

(52) U.S. Cl.
  CPC ............ *H04L 67/52* (2022.05); *H04L 67/535* (2022.05); *H04L 67/561* (2022.05); *H04W 4/029* (2018.02)

(56) References Cited

U.S. PATENT DOCUMENTS

| | | | | |
|---|---|---|---|---|
| 8,321,527 | B2* | 11/2012 | Martin | H04L 67/18 |
| | | | | 709/217 |
| 8,401,923 | B1* | 3/2013 | Lester | G06Q 30/08 |
| | | | | 705/26.41 |
| 8,606,710 | B2 | 12/2013 | Park | |
| 8,660,867 | B2 | 2/2014 | Krivopaltsev et al. | |
| 9,710,821 | B2* | 7/2017 | Heath | G06Q 30/02 |
| 9,747,285 | B1* | 8/2017 | Laufer | G06F 16/9537 |
| 9,799,020 | B2* | 10/2017 | Howe | G06Q 20/20 |
| 9,799,034 | B1* | 10/2017 | Varma | G06Q 20/327 |
| 9,959,529 | B1* | 5/2018 | Varma | G06Q 20/102 |
| 10,068,272 | B1* | 9/2018 | Varma | G06Q 30/0633 |
| 10,285,008 | B2* | 5/2019 | Spears | G01C 21/3484 |
| 2001/0037174 | A1* | 11/2001 | Dickerson | G06Q 50/30 |
| | | | | 701/400 |
| 2005/0086100 | A1* | 4/2005 | Yanagisawa | G07B 15/063 |
| | | | | 705/13 |
| 2006/0149684 | A1* | 7/2006 | Matsuura | G06Q 20/367 |
| | | | | 705/65 |
| 2007/0100651 | A1* | 5/2007 | Ramer | G06Q 30/06 |
| | | | | 705/37 |
| 2008/0195428 | A1* | 8/2008 | O'Sullivan | G06Q 10/00 |
| | | | | 705/6 |
| 2009/0237245 | A1 | 9/2009 | Brinton et al. | |
| 2009/0283591 | A1* | 11/2009 | Silbernagl | G06Q 20/14 |
| | | | | 235/382 |
| 2010/0153191 | A1* | 6/2010 | Hamilton, II | G06Q 50/14 |
| | | | | 705/13 |
| 2011/0060600 | A1 | 3/2011 | Fox et al. | |
| 2011/0153495 | A1 | 6/2011 | Dixon et al. | |
| 2011/0238514 | A1* | 9/2011 | Ramalingam | G06Q 30/0256 |
| | | | | 705/16 |
| 2012/0190386 | A1 | 7/2012 | Anderson | |
| 2013/0030964 | A1 | 1/2013 | Nuzzi et al. | |
| 2013/0073389 | A1* | 3/2013 | Heath | G06Q 50/01 |
| | | | | 705/14.54 |
| 2013/0185123 | A1 | 7/2013 | Krivopaltsev et al. | |
| 2013/0246125 | A1* | 9/2013 | DiGioacchino | G06Q 30/0201 |
| | | | | 705/7.33 |
| 2013/0281124 | A1 | 10/2013 | Laumen et al. | |
| 2013/0297448 | A1* | 11/2013 | Lester | G06Q 30/06 |
| | | | | 705/26.8 |
| 2014/0156396 | A1* | 6/2014 | deKozan | G06Q 30/0261 |
| | | | | 705/14.53 |
| 2014/0200038 | A1 | 7/2014 | Rao et al. | |
| 2014/0330505 | A1 | 11/2014 | Wenneman et al. | |
| 2015/0006072 | A1* | 1/2015 | Goldberg | G06Q 10/02 |
| | | | | 701/408 |
| 2016/0026936 | A1* | 1/2016 | Richardson | G06Q 10/02 |
| | | | | 705/5 |
| 2016/0042303 | A1* | 2/2016 | Medina | H04W 4/024 |
| | | | | 705/5 |
| 2016/0117651 | A1* | 4/2016 | Davis | G06Q 20/386 |
| | | | | 705/40 |
| 2016/0117665 | A1* | 4/2016 | Davis | G06Q 20/386 |
| | | | | 705/39 |
| 2016/0117666 | A1* | 4/2016 | Davis | G06Q 20/386 |
| | | | | 705/39 |
| 2016/0117670 | A1* | 4/2016 | Davis | G06Q 20/40 |
| | | | | 705/39 |
| 2016/0180316 | A1* | 6/2016 | Wang | G06Q 20/4015 |
| | | | | 705/39 |
| 2016/0320195 | A1* | 11/2016 | Liu | G06Q 50/01 |
| 2016/0364678 | A1* | 12/2016 | Cao | G06Q 50/30 |
| 2016/0364679 | A1* | 12/2016 | Cao | G06Q 50/30 |
| 2016/0364812 | A1* | 12/2016 | Cao | G06Q 50/30 |
| 2016/0364823 | A1* | 12/2016 | Cao | G06Q 50/30 |
| 2018/0032928 | A1* | 2/2018 | Li | G06Q 10/08 |

FOREIGN PATENT DOCUMENTS

| | | | |
|---|---|---|---|
| DE | 102012009610 | | 11/2013 |
| EP | 2658291 | A1 | 10/2013 |
| EP | 2912658 | | 5/2014 |
| EP | 2747035 | A1 | 6/2014 |
| EP | 3109818 | A1 | 12/2016 |
| EP | 3172708 | B1 | 5/2021 |
| EP | 14178307 | | 5/2021 |
| JP | 2005100023 | A | 4/2005 |
| RU | 2126174 | C1 | 2/1999 |
| RU | 2336569 | C2 | 10/2008 |
| RU | 2556453 | C2 | 7/2015 |
| RU | 2018119489 | A | 11/2019 |
| WO | WO-2001069540 | A1 | 9/2001 |
| WO | WO-2004051580 | A1 | 6/2004 |
| WO | WO-2012143301 | | 10/2012 |
| WO | WO-2013109639 | | 7/2013 |
| WO | WO-2013192533 | | 12/2013 |
| WO | WO-2014037949 | A2 | 3/2014 |
| WO | WO-2014066948 | | 5/2014 |
| WO | WO-2014175534 | | 10/2014 |
| WO | WO-2015056269 | A1 | 4/2015 |
| WO | WO-2015106189 | | 7/2015 |
| WO | WO-2016012475 | | 1/2016 |

OTHER PUBLICATIONS

European Extended Search Report issued in EP16860879.2, dated Apr. 29, 2019 (8 pages).
Eichler, et al., "From single device localization towards mobile network-based route calculation", Ortsbezogene Anwendungen und Dienste: 9. Fachgesprach der GI/ITG-Fachgruppe Kommunikation und Verteilte Systeme, Technische Universitat Chemnitz, Sep. 13-14, 2012, pp. 7-20 (21 pages).
Opposition against European Patent EP3172708, filed by Bardehle Pagenberg Partenerschaft mbB, Feb. 14, 2022 (72 pages)—English Translation.
Opposition against European Patent EP3172708, filed by Dr. Frank Schorr, Feb. 11, 2022 (58 pages)—English Translation.
Opposition against European Patent EP3172708, filed by Siemens Feb. 11, 2022 (16 pages)—English Translation.
Wikipedia article, "Cell phone", <https://de.wikipedia.org/w/index.php?title=Mobiltelefon&oldid=131900767>, published Jul. 6, 2014 (17 pages)—German Language.
Feature Subdivision of Claim 1, Exhibit O4 cited in Opposition against EP3172708 by Bardehle Pagenberg, dated Feb. 14, 2022 (2 pages).

* cited by examiner

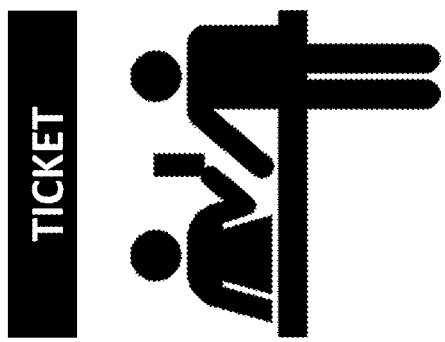
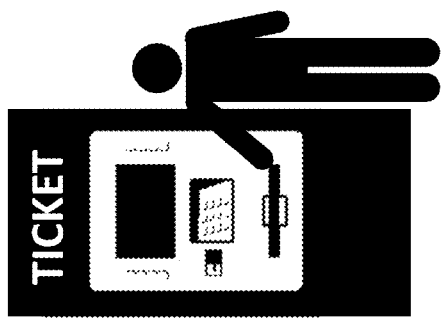
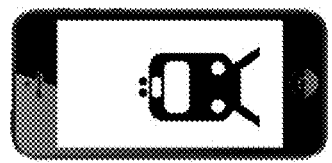
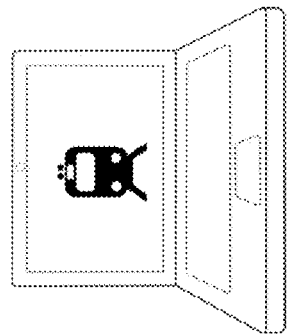
FIG. 1 (Prior Art)

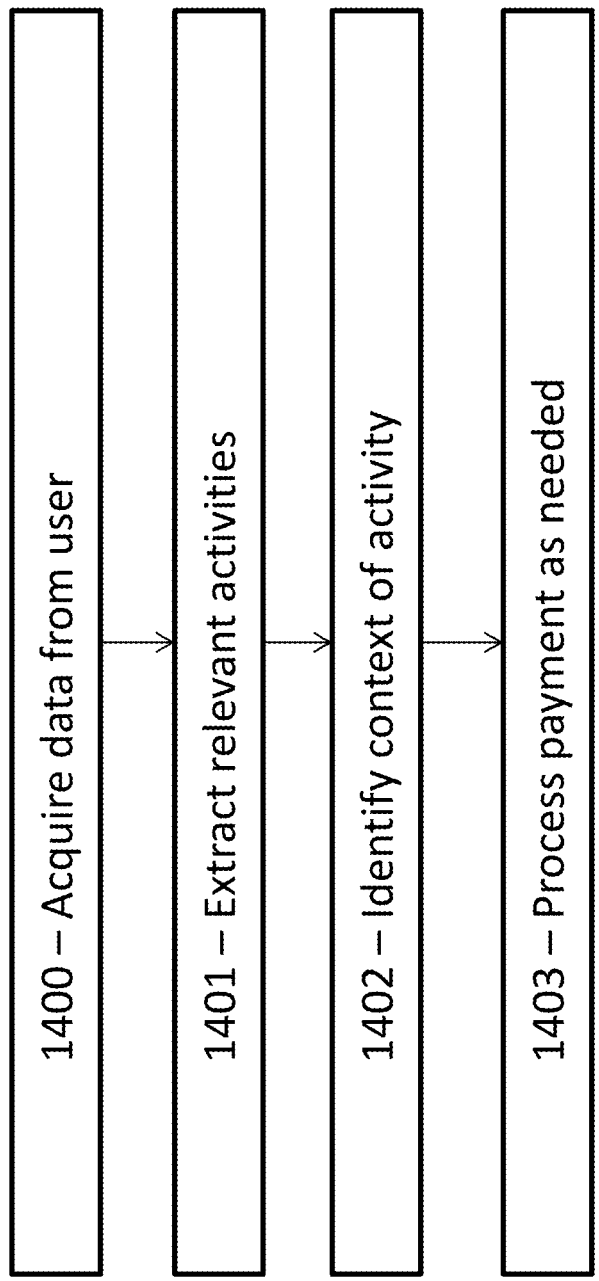

SYSTEM AND METHOD FOR LOCATION-BASED PASSIVE PAYMENTS

CROSS-REFERENCE TO RELATED APPLICATIONS

This application claims priority to U.S. Provisional Application No. 62/247,997, filed Oct. 29, 2015, which is incorporated herein by reference.

TECHNICAL FIELD

Embodiments of the present invention generally relate to online purchases, and in particular to location-based passive payments.

BACKGROUND

Most forms of traditional ticketed transportation involves user input to purchase a ticket. Train and light rail customers rely on the purchase of long term tickets, online sales through mobile applications or websites, or physical ticket purchases at kiosks and ticket counters in train stations and from conductors on the vehicle. Each of these ticket purchases require input from the customer. This input can be speech (at ticket counters), or through a software interface. They require input on where the customer is leaving from, where he is going to, which train he wants to take and which class he wants to travel in. The user input required for travel wastes a traveler's time and can cause inconvenience when the input has to occur at a certain time or place. In some cases, users can be fined for non-payment of a ticket if the user is unable, due to technical malfunctions or timing constraints, to provide the correct inputs for a trip in order to purchase a ticket.

Ticketing in general can be a waste of time and resources. For example, buying a ticket to attend a movie requires standing in line or filling out information online. Additionally, resources are wasted in needing to print a ticket to enter the movie theater. As another example, parking a car in a parking garage often requires getting a ticket and going to a kiosk when leaving to pay for the ticket. Both time and paper is wasted in terms of user time and the printing of a ticket.

SUMMARY OF THE INVENTION

Systems and methods are described herein for passively processing a payment for an activity that leverages location data of a user participating in the activity. In some embodiments, a computing device receives user data, the user data including a plurality of user location points and a time associated with each of the plurality of user location points, determines an activity associated with the user based on the user data, wherein the activity is associated with at least one of transportation and attendance at a venue, identifies an instance of the activity and processes a payment amount for the user based on the instance of the activity.

In some embodiments, determining an activity includes extracting metadata from the user data for each location point, tagging the metadata with information relevant to the activity to form a collection of features describing the metadata, and associating each of the location points activity information based on the collection of features describing the metadata. In some embodiments, determining an instance of the activity includes comparing the user data with at least one of location information associated with the instance of the activity and timing information associated with the instance of the activity.

In some embodiments, the systems and methods described herein include a computing device for receiving at least one of location information and timing information associated with the instance of the activity from a database external to the computing device. In some embodiments, a computing device determines, based on the plurality of locations points, at least one of a start time of the activity, an end time associated with the activity, and a duration of the activity. In some embodiments, an activity is further associated with at least one of watching a movie, attending a concert, parking in a parking garage, riding at least one of a train, bus, and ferry, and driving through a toll booth. In some embodiments, an instance of the activity is at least one of one movie theater of a plurality of movie theaters associated with the user watching a movie, one concert venue of a plurality of concert venues associated with the user attending a concert, one garage of a plurality of parking garages associated with the user parking a car, one train of a plurality of trains associated with the user riding on the train, one bus of a plurality of buses associated with the user riding on the bus, one ferry of a plurality of ferries associated with the user riding on the ferry, and one toll booth of a plurality of toll booth locations associated with the user driving through the tollbooth.

In some embodiments, the payment amount is greater than zero when the activity is associated with a cost for participating in the activity. In some embodiments, the systems and methods include a computing device that transmits information associated with the payment to a user device associated with the user.

These and other capabilities of the disclosed subject matter will be more fully understood after a review of the following figures, detailed description, and claims. It is to be understood that the phraseology and terminology employed herein are for the purpose of description and should not be regarded as limiting.

BRIEF DESCRIPTION OF FIGURES

Various objectives, features, and advantages of the disclosed subject matter can be more fully appreciated with reference to the following detailed description of the disclosed subject matter when considered in connection with the following drawings, in which like reference numerals identify like elements.

FIG. 1 is a diagram showing a traditional method of purchasing a train ticket.

FIG. 14 is a flowchart showing a process of passive payments, according to some embodiments of the present disclosure.

DETAILED DESCRIPTION

Figure 2:
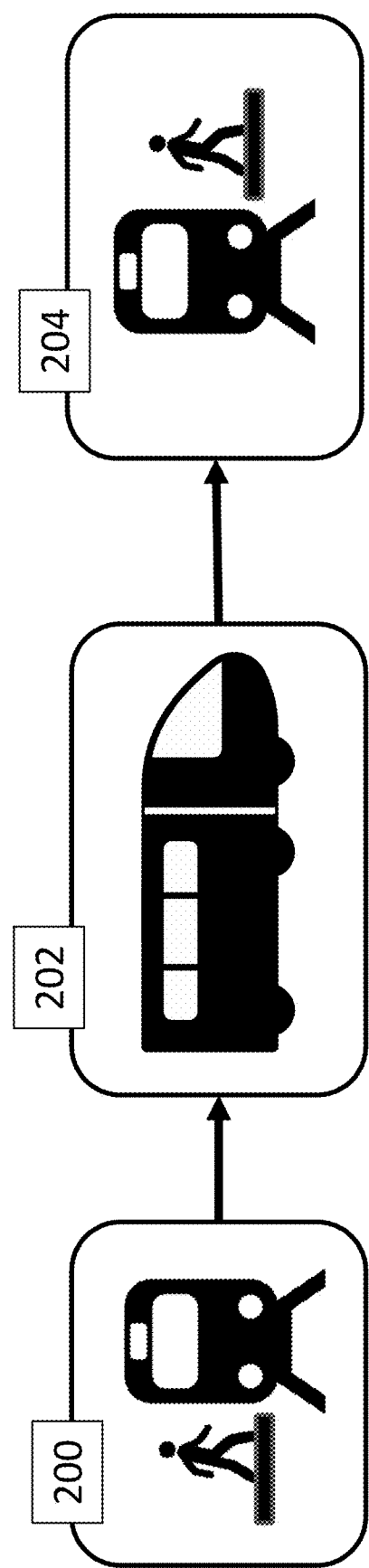
FIG. 2 is a diagram showing an overview of a process for passive payments for a train ticket, according to some embodiments.

Systems and methods are disclosed herein for using location tracking on mobile devices to understand when a user takes a train and is capable of understanding which train they are on and which ticket they need. A ticket is then purchased for the user without needing any input from the user on the device, enabling him to continue on his journey without interruption.

In some embodiments of the present disclosure, the systems and methods described herein for passive payment are applicable to all public transportation, including but not limited to trains, trams, buses, taxis, ferries, subways and planes. The systems and methods described herein are also applicable to events, including but not limited to theatre, movies, and sporting events.

Transportation examples include travel by train, bus, car, ferry, plane, bicycle, and autonomous vehicle. In some embodiments, the mode of transport detection algorithm identifies the vehicle being used, connects to the schedule of the vehicle, and calculates the journey of the user with that mode of transport. An API can plug into the payment system to handle the purchasing of the ticket for the journey.

Venue examples include concert halls, sports events, movie theatres, fitness centers, and parking garages. For these use cases, the detection algorithm, in some embodiments, detects if a person is in a specific location for a period of time. APIs can then connect to the venue's ticketing platform.

In some embodiments, the systems and methods described herein can be used for toll gates. For toll gates, the mode of transport can be combined with a specific road segment the user is traveling on and the vehicle or the driver of the vehicle can connect to the toll system's APIs to execute the payment of the charge. This technology can run within the driver's smart device, but can also be installed in the car itself, provided the car is equipped with a GPS system and a communication technology.

FIG. 1 is a diagram showing a traditional method of purchasing a train ticket.

FIG. 1 shows a user purchasing a ticket from an attendant 100, a user purchasing a ticket from a ticket vending machine 101, a user purchasing a ticket from a mobile device 102, a user purchasing a ticket from a computer 103, and a user purchasing a ticket from a ticketing agent on the train 104. As described above, each of these methods for purchasing a ticket has drawbacks. For example, a user has to allot extra time in their schedule to account for time associated with waiting in line when purchasing a ticket from an attendant 100 or from a ticket vending machine 101. Purchasing a ticket through an internet-connected device (e.g., 102 103) requires that the user enter information about a combination of starting destination, ending destination, travel time and payment information. Purchasing a ticket from an attendant on the train 104 can require that the user carry paper currency. Purchasing a ticket from an attendant on the train can also result in higher fares due to pricing structures or penalties associated with buying tickets on a train.

FIG. 2 is a diagram showing an overview of a process for passive payments for a train ticket, according to some embodiments.

Referring to step 200, a user boards a train at a starting destination. As described in more detail below, in order to use some of the systems and methods described herein, the user has a mobile device capable of connecting to other devices or servers, and transmitting and receiving information to the other devices or servers (e.g., through a network). In some embodiments, the mobile device also has location tracking capability (e.g., GPS, Wifi, Cell ID, Bluetooth). As described in more detail below, the mobile device can also be hosting an application that records the location information and communicates the information to a server.

Referring to step 202, the user is traveling on the train from the starting destination to a final destination. As noted above, the mobile device can host an application that records the user's location information and communicates the information to a server. The determination and recording of the location of the user can be done without any user interaction. In some embodiments, a ticket is purchased for the user based on the location information.

Referring to step 204, the user disembarks from the train. In some embodiments, the user is notified after disembarking of the train that a ticket was purchased. In some embodiments, the notification of purchase can be communicated to the user while the user is still on the train. In either case, the user has completed a trip and purchased a ticket for the trip without the user needing to wait in line, or spend time purchasing a ticket.

Figure 3:
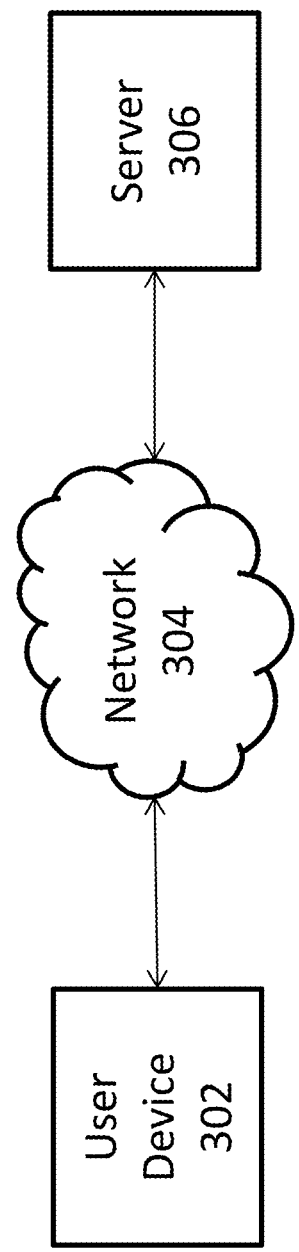
FIG. 3 is a system diagram showing a networked system, according to some embodiments of the present disclosure.

FIG. 3 is a system diagram showing a networked system, according to some embodiments of the present disclosure. FIG. 3 shows a user device 302, network 304, and server 306.

As described above, the user device 302 can be associated with a user participating in the passive ticketing systems and methods described herein and can collect information from users participating in the networked system. In some embodiments, the user device 302 can include any computerized device capable of recording and transmitting information about a user's proximity to another user or to a location. In some embodiments, the computerized device can include a smart phone, tablet, computer, laptop, car, or smart watch that may be installed with a mobile application that facilitates the gathering of data. As described in more detail below in the text accompanying FIG. 4, the user device can include a data acquisition module and a notification module.

In some embodiments, the user device 302 can include vehicle-mounted data collection agents such auto onboard diagnostics modules, telemetrics and telematics modules, transponders, onboard GPS modules, and other systems that collect relevant data.

In some embodiments, user device 302 can include consumer wearable devices or fitness monitors such as the Jawbone Up, Fitbit Charge, or Apple Watch devices.

In some embodiments, data can be transmitted directly from user device 302 to network 304 (e.g., in the case of the mobile application) or can be collected through an intermediate step. For example, in the case of a vehicle telemetrics system, an intermediate module may be utilized to gather information from the onboard device and transmit it over a wireless link to a smartphone where it may then be transmitted to network 304.

In some embodiments, a mobile application can be installed on a user's smartphone computing device and provide the user with the ability to opt-in to various data collection mechanisms. For example, a user can permit the system described herein, via the mobile app, to gather the user's contacts, Facebook friends, Instagram friends, position data over time, and payments made using the smartphone computing device, telephone and messaging patterns.

In some embodiments, a user device 302 can take the form of an application or applets that is provided with various connected devices. For example, an app embedded in a DVR could transmit data concerning viewing habits and preferences, while software embedded in a car's navigation system could transmit data concerning position and driving patters.

It will be appreciated by those of skill in the art that there is no limit to the type and variety of user devices that can be utilized with systems described in the present disclosure.

Network 304 enables communication between the user device 302. Network 304 can be public network such as the Internet, with each of the user device 302 and server 304 connected via a gateway using communication protocols such as Wi-Fi, Ethernet and 4G wireless. Alternatively, network 304 can be a closed network such as a local area network (LAN) with the various components of the relationship analytics system not accessible on the open Internet. In some embodiments, communications via network 304 can be encrypted, or additional security protocols me be utilized such as virtual private network (VPN) or secure socket shell (SSH) tunneling.

Server 306 can include one or more server computers implementing a database for holding the data gathered about the user. As described in more detail below in the text accompanying FIG. 5, server 306 can also include an activity detection module, instance matching module, and a billing module for processing user-location information and billing the user accordingly. In some embodiments, a particular configuration of server 306 can depend on a number of factors such as the type of database, the anticipated size of the database, and user performance expectations. In some embodiments, the system is scalable and additional processing capacity can be added as demand increases. In some embodiments, the system can be the user device 302 itself and one or more of network 304 and server 306 is not required.

Figure 4:
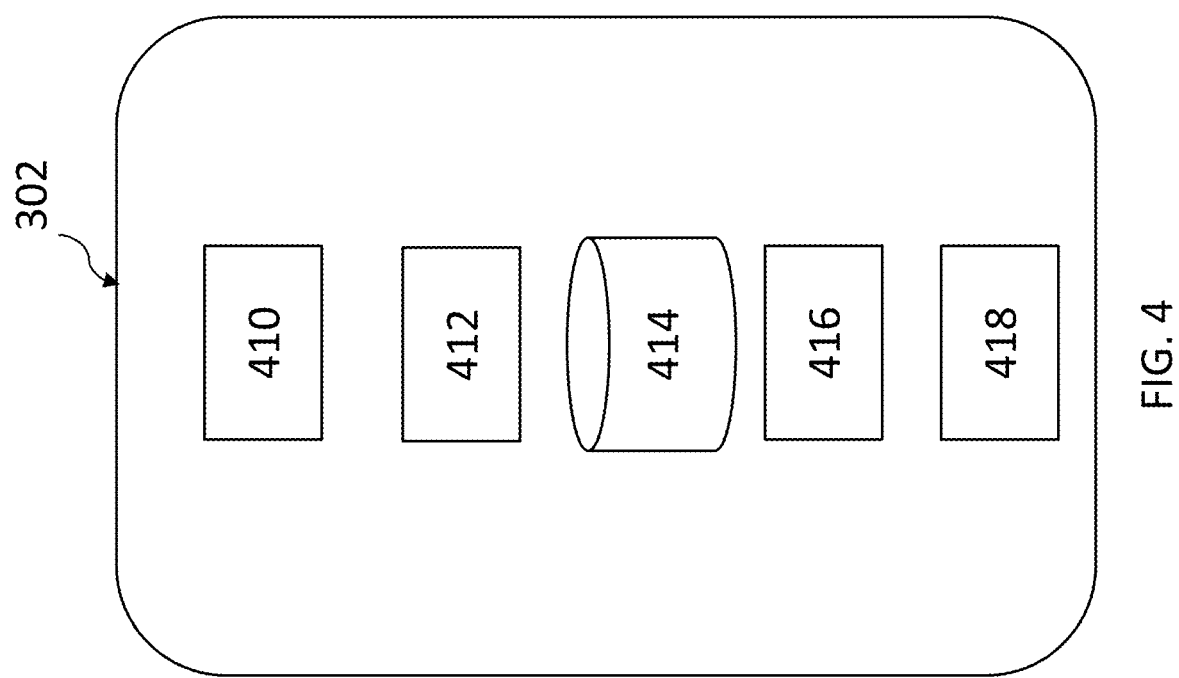
FIG. 4 is a system diagram of a user device, according to some embodiments of the present disclosure.

FIG. 4 is a system diagram of a user device, according to some embodiments of the present disclosure. The user device 302 includes a sensor module 410, preprocessing module 412, user device database 414, notification module 416, communication module 418.

The sensor module 410 can include one or more sensors that include GPS, Wifi, Cell ID, Bluetooth, barometer, accelerometer, gyroscope, and a magnetic field sensor. In some embodiments, the sensor module 410 can take sensor measurements periodically, triggered by several different conditions including time, distance travelled, and proximity to points of interest. These measurements can include the location and time of the device, and can also include the barometric pressure, acceleration, magnetic fields, and device orientation.

The preprocessing module 412 can receive sensor data from the sensor module and preprocess the data prior to storing the data locally or sending the data across the network. For example, in some embodiments, the preprocessing module 412 can be used to process data from the device sensors that is large to send over a network (e.g. accelerometer data), or that can be easily handled on the device.

The user device database 414 can receive and store data from the sensor module 410 or the preprocessing module 412. For example, in some embodiments, the user device 200 can cache data locally to save on battery usage, or because of a poor network connection.

The notification module 416 can provide updates and alerts to the user based on an action associated with the systems and methods described herein. For example, a notification can be displayed (e.g., on the display of the mobile device) or otherwise transmitted (e.g., by way of audio or vibration) to a user through the mobile device 200 alerting the user that their ride is finished, and notifying them that the user has been charged.

The communication module 418 transmits and receives data to and from the mobile device 302. For example, communication module 418 can transmit user data to a server 306 for further processing. Communication module 418 can also receive communications from a server (e.g., indicating that a payment has been processed).

As described in more detail below, in some embodiments, the modules and associated functionality shown in FIG. 5, and described in the text accompanying FIG. 5, can be located within a user device 302.

Figure 5:
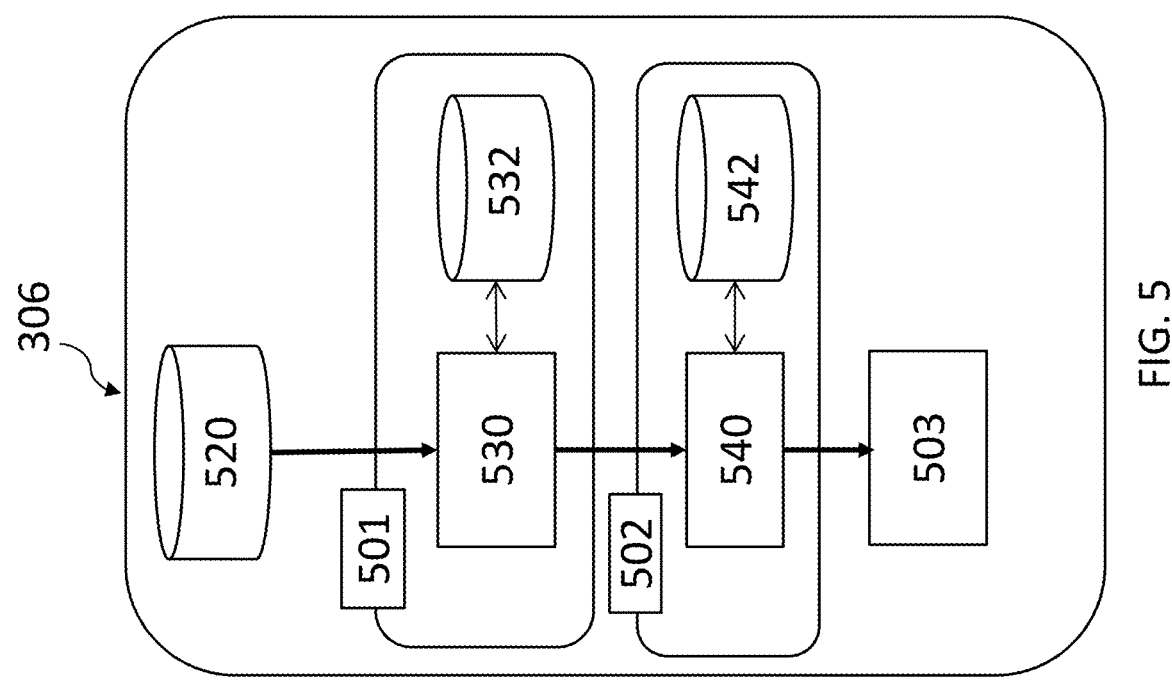
FIG. 5 is a system diagram showing a server 306, according to some embodiments of the present disclosure.

FIG. 5 is a system diagram showing a server 306, according to some embodiments of the present disclosure. The server 306 includes a server cache 520, an extraction module 501, instance detection module 502, and a charging module 503. Extraction module 501 includes an activity prediction module 530 and a user history database 532. Correlation module includes a schedule matching module 640 and a schedule matching database 542.

The server cache 520 stores data received from the user device 302 through the network 304. In some embodiments, the server cache 520 is used to store data until enough data has accumulated to provide an accurate assessment of the user's activities. In some embodiments, data received from the user device 302 is processed immediately in order to provide a continual estimate of user activities. One example of using continual matching is for travel applications where having many data points about a user's location can inform the type of travel. An example of using the server cache 520 to store the data is for a transactional application, such as movie or event ticketing, or ticketing for a parking garage, where predicting an occurrence and location of the event accurately using historical data is more important than processing many data user points during a current period of time.

Extraction module 501 receives data from a combination of the server cache 520 and directly from the user device 302 through the network 304. Extraction module 501 extracts the relevant portions of the data stream for specific schedule matching. In the example of train travel, this can include determining when the train trip began and ended and passing the location points within that range to the activity prediction module 530. This module can also detect the occurrence of the necessary events for matching in module 502. For example, for a parking garage use case, activity prediction module 530 can detect when a user has left their car in the parking garage. For a concert venue use case, activity prediction module 530 can detect that the user was at the venue and return the times between which this visit occurred. As described in more detail below in the text accompanying FIGS. 6-9, the activity prediction module 530 processes the user data to extract activity information, stores the activity information in user history database 532, and predicts an activity of the user based on user information in the server cache 520 and the user history database 532. User history database 532 is used to store a user's past activities so that the activity prediction module can learn from the user's past activities when tagging subsequent activities. For example, in a train ticketing example, when extraction module 501 is extracting train journeys from a stream of location points, it can be advantageous to know that a user typically commutes to work by train each morning. In an event based activity example, it can be advantageous to know that the user never parks on the street in the vicinity of the parking garage, therefore the accuracy of predicting that the user has parked their car in the parking garage is higher. In some embodiments, an activity can be any action performed over a period of time, e.g., parking a car, riding a train, attending an event. In some embodiments, the extraction module 501 receives activity information associated with the user device 302 prior to receiving location point data from the user device 302. For example, the user device 302 can subscribe to a service that is tied to a particular activity (e.g., a train ticketing service, movie ticket service). In some embodiments, extraction module 501 determines an activity associated with the user based received user data.

Instance detection module 502 receives the relevant portions of extracted data from extraction module 501 and matches the extracted data to a specific activity or schedule using instance detection module 502, as described in more detail below in the text accompanying FIGS. 9-11. For example, if the activity is train travel, instance detection module 502 would match the extracted data to a specific train schedule. In the case of a concert venue, instance detection module 502 can identify the specific event playing during the user's visit to that venue. Instance detection module 502 also stores the past activities of a user in schedule matching database 542 and incorporates the historical schedule data into its predictions. Using the example of a commuter going to work: If the system has historical data that indicates that the user always takes the 7:30 train into the office, it can recover from a day with sparse, or poor data. Using the example of a user going to a fitness center every Monday and Thursday morning, instance detection module 502 can limit the amount of data needed to identify these events. As described in more detail below in the text accompanying FIG. 11, the instance detection module 502 can look, for example in a transportation application, at the appropriate transportation network and determine precisely which journey was taken (for example, train number X from station A to station B at time T).

Charging module 503 charges the user for the service. Once an activity or schedule has been successfully detected the system can automatically bill the user. As described above, in some embodiments, an indication of the charge being completed is sent to the user device 302 over the network 304.

Charging module 503 charges the user for the service. Once an activity or schedule has been successfully detected the system can automatically bill the user. As described above, in some embodiments, an indication of the charge being completed is sent to the user device 302 over the network 304.

In some embodiments, the modules and associated functionality shown in FIG. 5, and described in the text accompanying FIG. 5 can be located within a user device 302.

Figure 6:
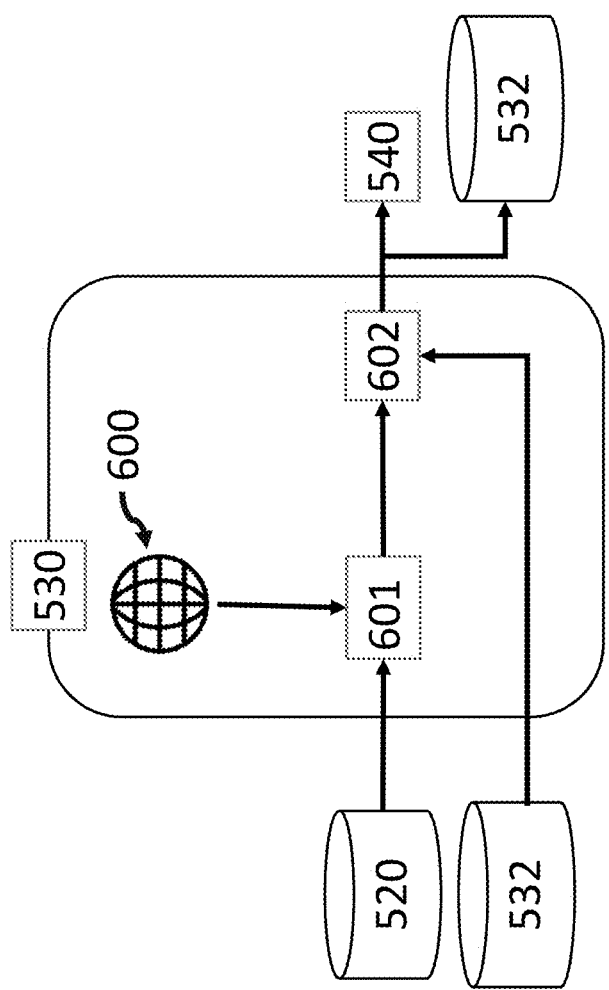
FIG. 6 is a system diagram showing the activity prediction module 530, according to some embodiments of the present disclosure.

FIG. 6 is a system diagram showing the activity prediction module 530, according to some embodiments of the present disclosure. The activity prediction module 530 includes an external data store 600, metadata module 601, and prediction module 602.

Metadata module 601 receives data from server cache 520 and external data store 600. The metadata module 601 calculates metadata or features (a term used in machine learning models) based off of the received data. To generate the metadata, metadata module 601 can receive tags or parameters from external data store 600. For example, external data store 600 can be transportation/rail links from geographic information system (GIS) providers such as Google, or OpenStreetMap, or venue information. Using the example of tagging points corresponding to trains, the metadata extracted by metadata module 601 can include: the user's velocity at a certain time-location point, the distance of each time-location point to the nearest train track, the distance to the nearest train station, and the distance to the nearest road segment. Examples of tagging points with respect to movies, the metadata extracted by module 601 can include the Wifi routers are within range, the cell ID, the presence of other Bluetooth devices around the user for the period of time the movie lasts, and the accelerometer activity. In such cases where the activity is event or venue based, the external data stores used can include venues information such as geospatial coordinate, opening hours or schedule (in the case of an event), category (or type) of venue. In the example of a parking garage, this could include the mode of transport before, and after the visit to the garage (indicating that a user drove to the garage, and walked away from it). It could also include barometric pressure (indicating the user drove up the ramps of the garage and which level the user parked on).

Prediction module 602 employs a machine learning model that, as described in more detail below in the text accompanying FIGS. 7-9, makes a prediction based on the metadata generated from metadata module 601 and the data from the user history database 532. The prediction information that is output from prediction module 602 is also fed back into user history database 532 as historical data that informs future predictions. For example, in the case where an activity involves a mode of transportation, it could identify the user driving from home to the train station, followed by a train commute to a nearby town where the user works, and a walk from the train station to work. This example could lead to passive payment for both the train ride and parking the car in a paid parking lot.

Figure 7:
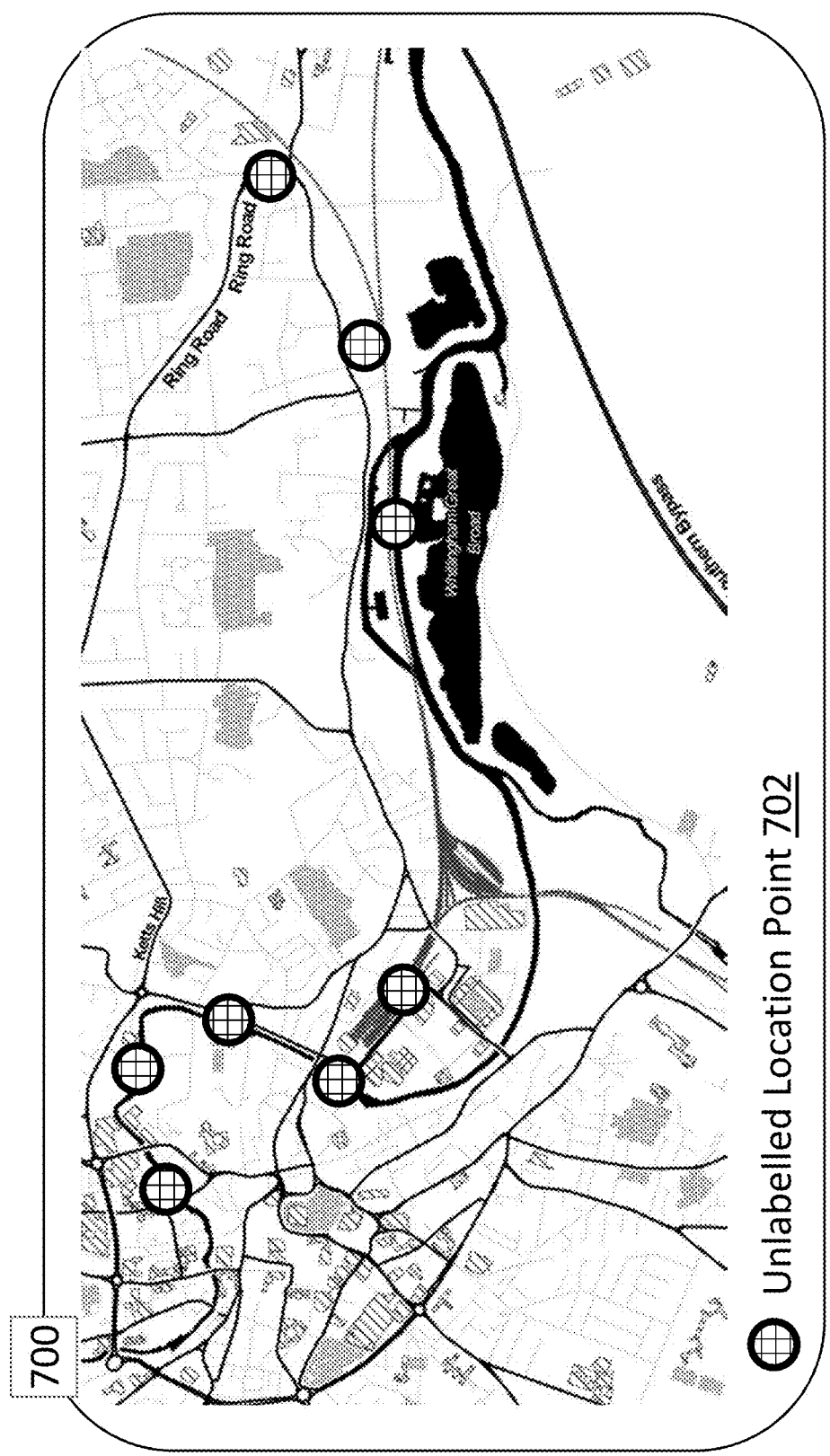
FIG. 7 is a diagram showing unlabeled location information received by the server from the user device, according to some embodiments of the present disclosure.

FIG. 7 is a diagram showing unlabeled location information received by the server from the user device, according to some embodiments of the present disclosure. FIG. 7 shows data received from the mobile device 700, and unlabeled location points 702.

In some embodiments, data received from a user device 700 includes location information that is unlabeled. As described above, the data received from the user device can be received directly by the extraction module 501 or stored first in the server cache 520. Using the example of extracting a train schedule from mobile phone data, some of the unlabeled points 702 can correspond to a train journey, and some unlabeled points 702 can correspond to a walking journey. In order to successfully match the user to a specific schedule, the unlabeled location points can be tagged with the correct mode of transport. Often, these points are irregularly positioned in time and space. The unlabeled points 702 can also contain errors that can displace the points up to several hundred meters from where the user was actually located.

Figure 8:
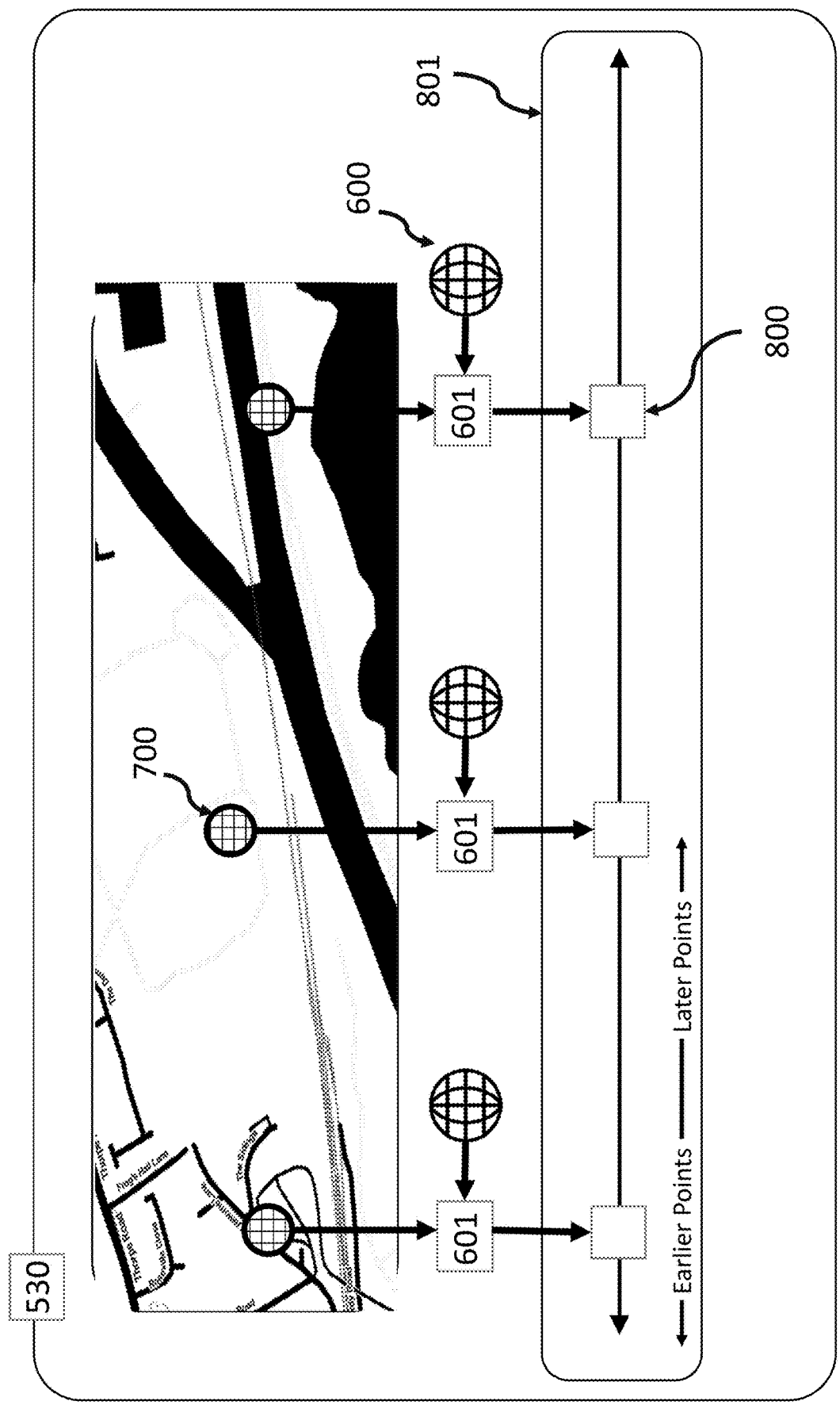
FIG. 8 is a diagram showing a portion of the processing in the activity prediction module 530 including the metadata module 601, according to some embodiments of the present disclosure.

FIG. 8 is a diagram showing a portion of the processing in the activity prediction module 530 including the metadata module 601, according to some embodiments of the present disclosure. FIG. 8 shows a collection of features 800 and an aggregated set of features 801.

As described above, the metadata module 601 combines data received from the mobile data device 700, which can include data received directly from mobile devices through the network or from the server cache 520, and from external data store 600. This combination of data occurs for every point for which data is received. The data is combined to generate metadata (features). A collection of features at each point is indicated by box 800. These can include calculated quantities, such as the distance of the location point to various elements of interest, such as the distance to nearest road or railroad, whether the location point is on land or in the water, the velocity returned by the device, or calculated from the time and location of neighboring location points. Each of the collection of features 800 are associated with a point and are ordered in time. The set of the collection of features 800 are bundled to form an aggregated set of features 801. The aggregation is performed between delimiters, which can be any event that allows to distinguish clearly between two sequences of activities. For example, if the user records a lengthy dwell at home, followed by multiple location points and a dwell at work, the dwells can be delimiters and the location points between them can be aggregated into a sequence. These delimiters can be selected based on the application. Using the example of attendance at a music concert, the relevant delimiter can be the times when the user is within a certain distance of the venue. In the example of a parking garage, the delimiter can be time based, and the system can analyze the behavior of the user for a certain time window surrounding their visit to the parking garage.

Figure 9:
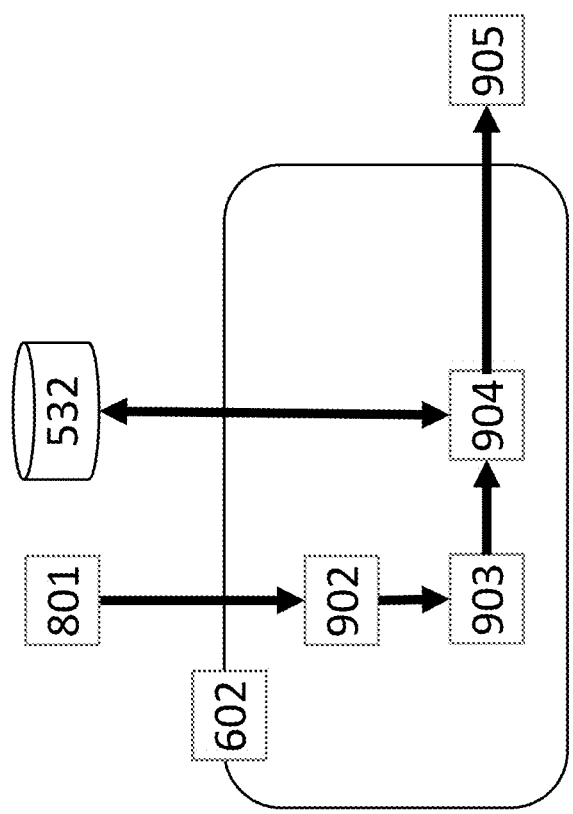
FIG. 9 is a diagram showing the prediction module 602, according to some embodiments of the present disclosure.

FIG. 9 is a diagram showing the prediction module 602, according to some embodiments of the present disclosure. The prediction module 602 includes a data cleaning module 902, an activity tagging module 903, a correction module 904, and the prediction 905.

The data cleaning module 902 receives the aggregated set of features 801, which was described in the text accompanying FIG. 8. The data cleaning module 902 cleans the received data, filtering or correcting any spurious data caused by device inaccuracy. For example, the location accuracy may be degraded when a device is unable to perform a GPS measurement. Additionally, the device may make location measurements by scanning the available WiFi networks. This assumes the WiFi networks are stationary, which they may not be (e.g. WiFi on a train or on a bus). Another common artifact occurs when the GPS measurement becomes inaccurate due to the signal being reflected off tall buildings. Data cleaning can be accomplished by a myriad of different algorithms such as clustering, or Median Average Deviation filters.

The activity tagging module 903 receives the cleaned data from the data cleaning module 902 and tags the cleaned data with information relevant to an activity. For example, in the case of train ticketing, the activity tagging module 903 tags modes of transit. The activity tagging module 903 includes a machine learning algorithm that is trained on sequences of data that have been labelled with accurate modes of transport (known as "truth data") and can accurately tag data with activities given the features generated in 601. Because the machine learning algorithm used by the activity tagging module 903 is a sequence tagging algorithm, the algorithm is resistant towards inaccurate input data. Using trains as an example, the short sequence train→train→walking→train→train is an unlikely sequence. Much more likely is that the walking point in the middle is spurious, and the sequence consists of only location points on a train. A sequence tagging algorithm is able to compensate for these cases. This sequence tagging model can also output its confidence in the selected tags, as well as alternative tags. For example, in the above train/walking sequence, each element can be an ensemble of probabilities or confidences such as (train: 90%, walking 8%, car 2%) or (walking 50%, train 48%, car 2%) which get a label assigned based on some criterion such as the label with the largest probability.

The correction module 904 receives tagged data from the activity tagging module 903 and receives user history data from the user history database 532. Based on the user history data the confidences associated with the tags, and the presence of alternative tags, the correction module 904 can choose to correct the tagged data. An example of correcting tagged data includes when the train stops at a station. In this scenario the low measured velocity may cause the model to tag the user's location points during the stop as "walking". The context allows module 904 to correct the tag, as the user was still on a train and the train label is more appropriate. Similarly, if a user watching a movie briefly leaves to use the washroom and then returns, the model should not infer that the user went to see two short movies and went for a walk in between but rather saw a single normal-length movie. Once the tagged data is processed by the correction module 904, the prediction data is output 905. The prediction data includes a tag describing each point of data, as described in more detail below in the description accompanying FIG. 10.

Figure 10:
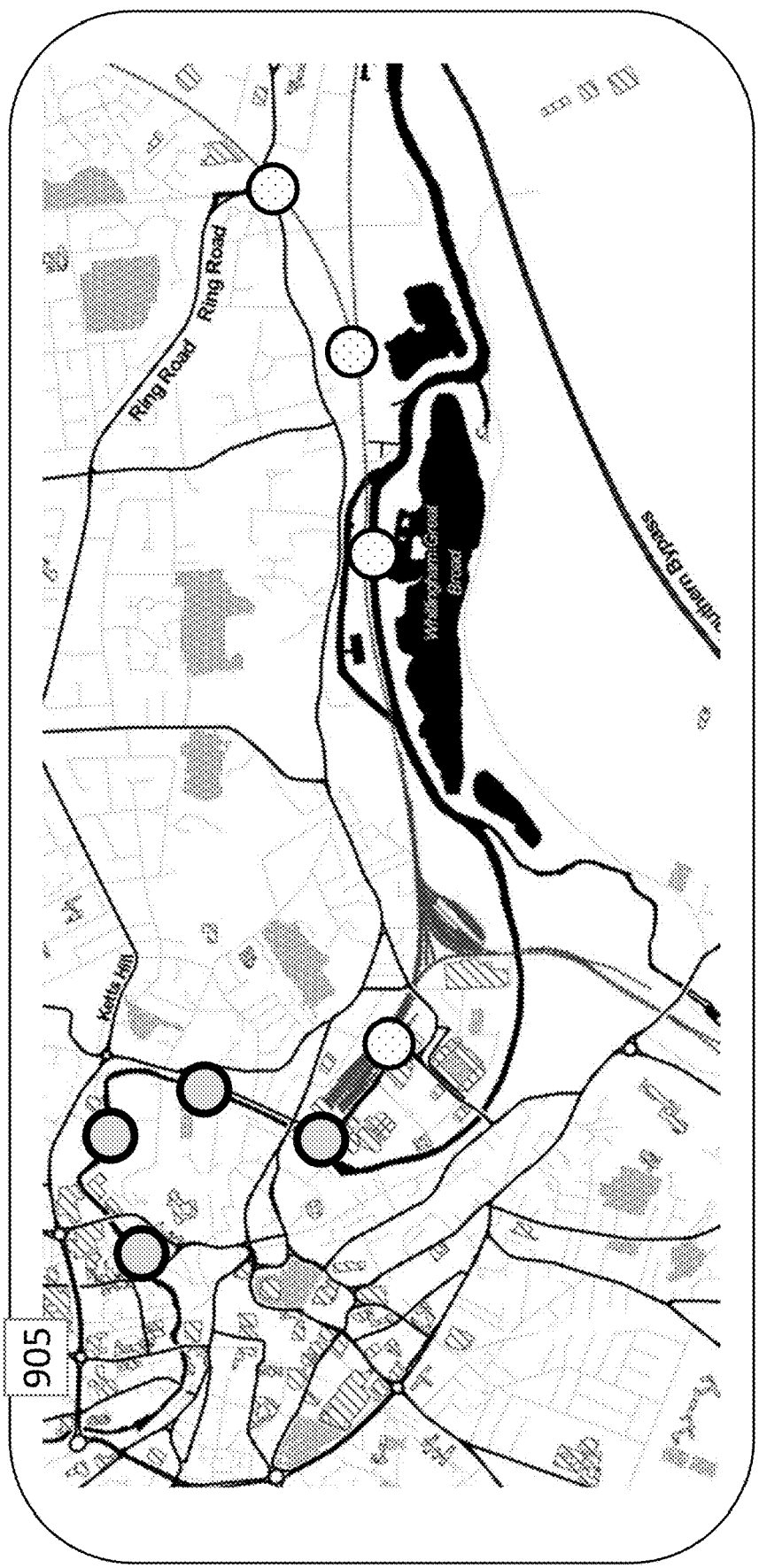
FIG. 10 is a diagram showing a prediction output 905, according to some embodiments of the present disclosure.

FIG. 10 is a diagram showing a prediction output 905, according to some embodiments of the present disclosure. FIG. 10 shows a walking location point 1002 and a train location point 1004.

Referring back to FIG. 7, data received from the mobile device 700 included points on a map, which were all designated as unlabeled 702. After processing the received data 700 using the activity prediction module 530, the output prediction data 905 includes points on a map that are all labeled as a walking location point 1002 or a train location point 1004. A walking location point 1002 refers to location data measured while a user is walking, and a train location point 1004 refers to a location data measured while the user was riding on a train.

Figure 11:
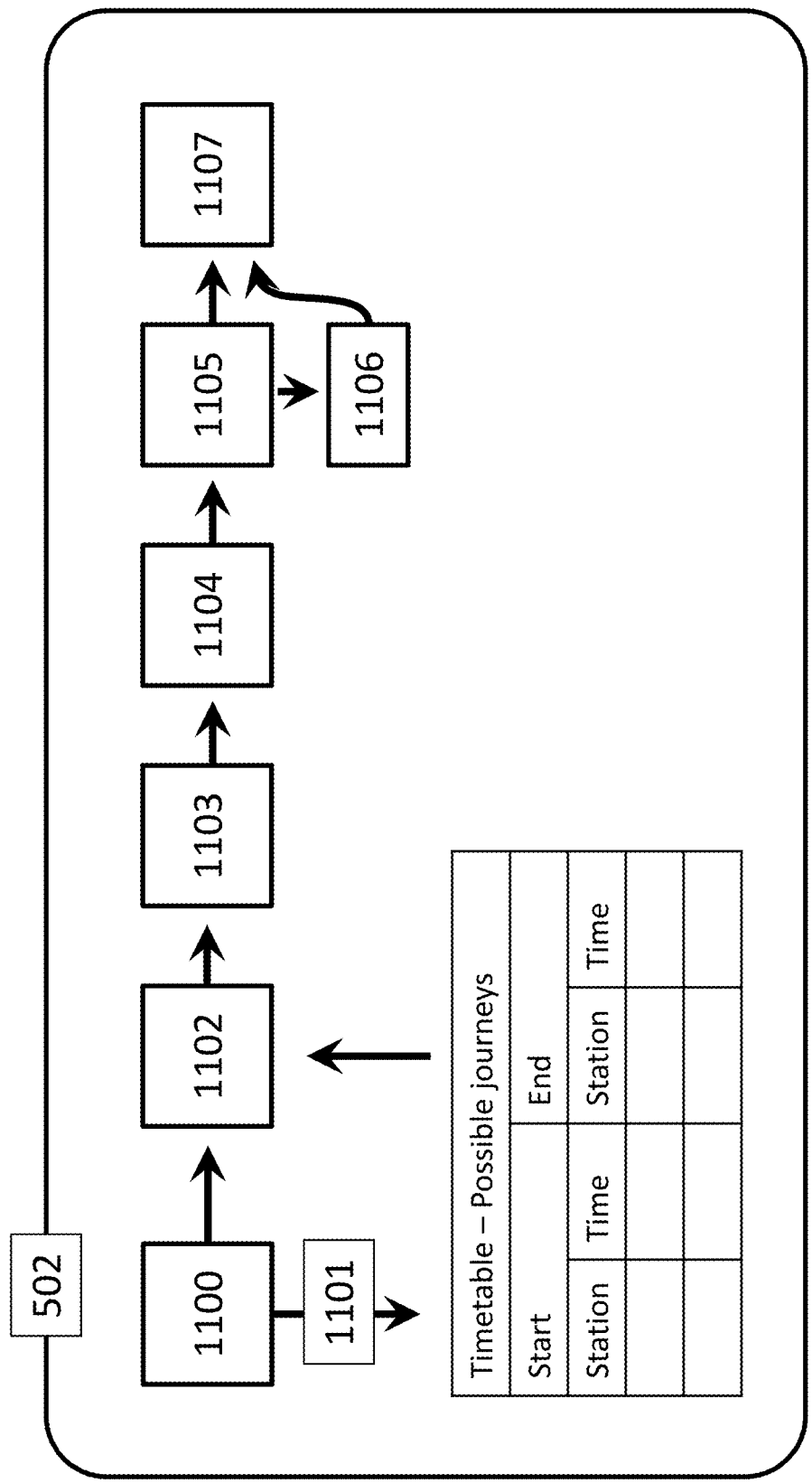
FIG. 11 is a flowchart showing the process of detecting an instance as implemented by the instance detection module 502, according to some embodiments of the present disclosure.

FIG. 11 is a flowchart showing the process of detecting an instance as implemented by the instance detection module 502, according to some embodiments of the present disclosure. In some embodiments, the instance detection module 502 can look, for example in a transportation application, at the appropriate transportation network and determine precisely which journey was taken (for example, train number X from station A to station B at time T).

Referring to step 1100, the instance detection module 502 identifies the bounds of a given activity. The activity, for example, can include travel, event attendance, or parking. The bounds for each of these activities can include the start and end of an activity, e.g. for a train ride the start would be the train stations where the user embarked and the end where the user disembarked. The instance detection module 502 can use the activity's location data but enhances it with its understanding of the underlying transportation network and filters for known artifacts. Known artifacts include locations not representing accurately a user's location (weak/no signal, the device cache surfacing erroneous locations, GPS signals reflecting on nearby tall buildings). Other data sources can also be incorporated at this point to refine this assessment, such as those from the schedule matching database 542, for example.

Referring to step 1101, the instance detection module 502 obtains possible instances (e.g., journeys, venues) based on the activity. For example, in the case of a train ride, the possible journeys include starting stations and associated times, and ending stations and associated times based on data that is available to the instance detection module 502 (e.g., downloaded from an external site hosting the information or stored in an internal servers). In the train example, one of many ways to reduce the number of possible journeys would the detection of a user dwelling before or after the train ride. In the example of a user going to the cinema, the challenge lies in identifying correctly the venue amongst the numerous possible ones nearby.

Referring to step 1102, the instance detection module 502 calculates the discrepancy between the user's data and all possible journeys. For example, the instance detection module 502 can calculate the distance between each of a user's location point and that of each possible journey, as described in more detail below. The instance detection module 502 can use the known trajectories for each segment of the journey and timings obtained from various sources to establish accurate positions at all relevant times.

Referring to step 1103, the instance detection module 502 filters the discrepancy data calculated in step 1102 for outliers. In some embodiments, the instance detection module 502 filters the discrepancy data by using methods such as detecting out-of-order elements in the sequence, median average deviation, and known artifacts due to data acquisition on the device. When known artifact are detected, these points can be ignored or treated with lower confidence. For example, certain artifacts occur only on trains, so while the location of such a spurious point is of limited value, the knowledge that the user was on a train at this time is definitely useful.

Referring to step 1104, instance detection module 502 evaluates which journey was most likely. The instance detection module 502 evaluates the 'goodness of fit' of each possible journey to select the best one. The distances returned by step 1102 are corrected for various factors (point density, uncertainty, etc.) and averaged together into a quality metric characterizing how good of a match each journey is to the user data. This is another step where, if desirable, historical data from step 542 can introduce known user-specific behaviors to help disambiguate between possible journeys.

Referring to step 1105, the instance detection module 502 assesses confidence in the outcome. The instance detection module 502 performs an assessment of confidence on the data obtained from step 1104. The instance detection module 502 incorporates a multiple factor analysis, including among other factors, the goodness of fit, the quality of the user data, and the presence of hard-to-distinguish journeys. If the confidence is high, the correlation module 502 sends a request for payment (step 1107). If confidence is not high enough, the correlation module 502 sends it for review (step 1106).

Referring to step 1106, the instance detection module 502 can review the outcome if the instance detection module 502 determines that the outcome is not satisfactory. The instance detection module 502 can allow for review of uncertain trips by human curators with advanced tools that help them either make a more accurate assessment, identify if any of the components are at fault (data from device, activity detection, etc.) or if multiple possible journeys are impossible to disambiguate with the available data. It then corrects incorrect assessments and can discard trips if wrongly detected (e.g. the user was driving a car on a road along a train track and the algorithm did not identify car, but made the error of assigning train instead). The instance detection module 502 then sends valid trips for payment processing (at step 1107) when high confidence is established by the added analysis.

Referring to step 1107, the instance detection module 502 can send a request for payment if the outcome is satisfactory. The instance detection module 502 can send a request for payment to charging module 503 for a detected billable activity of a certain user, e.g. taking a train that requires a ticket to ride.

Figure 12:
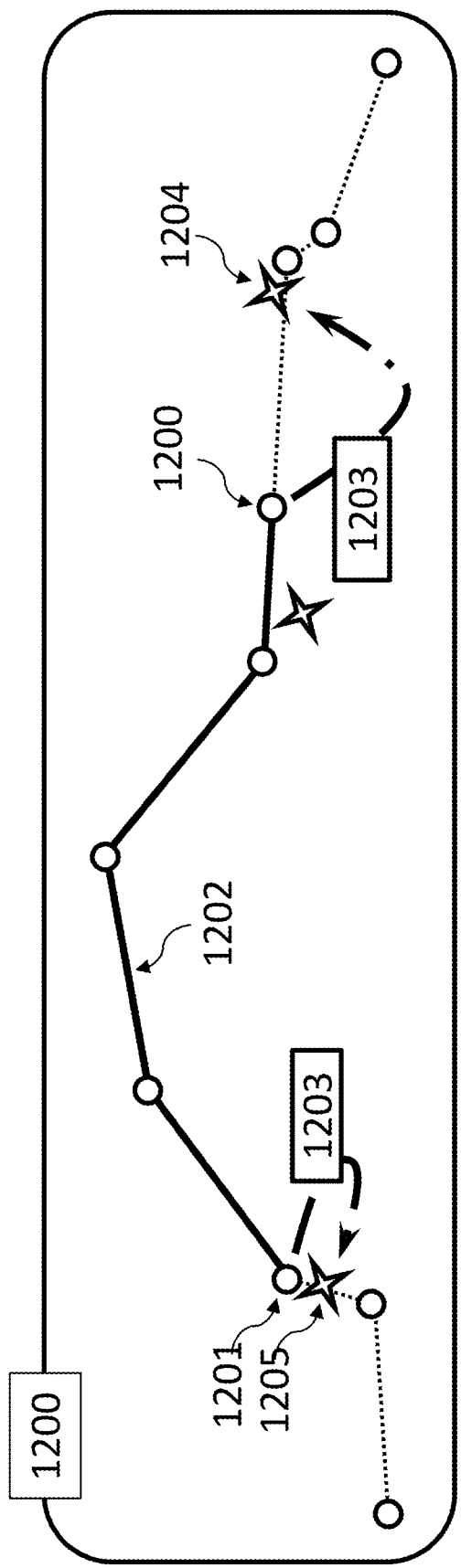
FIG. 12 is a diagram showing a process of determining a start and end location of an activity, according to some embodiments of the present disclosure.

FIG. 12 is a diagram showing a process of determining a start and end location of an activity, according to some embodiments of the present disclosure. FIG. 12 shows location point 1200, location point 1201, a segment 1202, end of activity 1204, end of activity 1205, and process by which end of activity 1204 1205 are identified 1203.

Location point 1200 is the location point that corresponds to the start of the segment being analyzed. Location point 1201 is the location point that corresponds to the end of the segment being analyzed. Segment 1202 is the segment of interest which includes all relevant location points occurring between the start location point 1200 and the end location point 1201 of the activity. Segment 1202 is represented as a thick black like connecting locations 1200 and 1201 in sequential order.

Step 1203 is the process of a fault-tolerant start and end station detection. Step 1203 can compensate for artifact, noise, systematic errors and other sources of error in the data as well as factoring in the underlying transportation network used to go from starting location point 1200 to end location point 1201 and outputs one or many potential start and end stations (1204 and 1205 respectively). 1204 is the venue or location where the user started the activity and 1205 is the venue or location where the user ended the activity. The selection of the best departure/arrival station combination can include, amongst other things, the distance between the activity's location points and possible stations, the number of connections needed to travel between the stations, the presence of dwells at a train station immediately before or after the train trip, a user's past history, various user-specific information such as home, work, habits, interests, etc.

Figure 13:
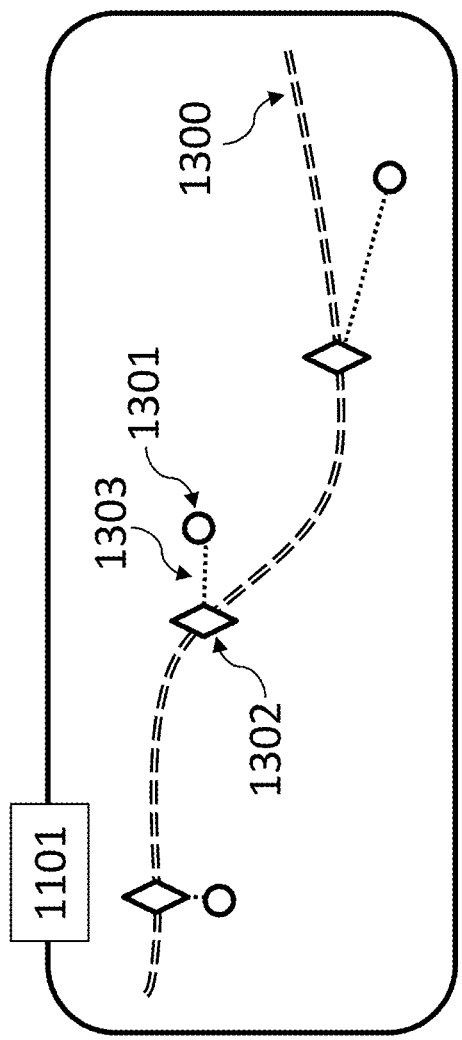
FIG. 13 is a diagram showing a process for evaluating possible journeys based on the activity, according to some embodiments of the present disclosure.

FIG. 13 is a diagram showing a process for evaluating possible journeys based on the activity, according to some embodiments of the present disclosure. FIG. 13 shows a path being evaluated 1300, user location 1301, known data 1302, deviation between user location and known data 1303.

The path being evaluated 1300 can refer to a journey taken by a user on foot or on a vehicle (e.g., the railroad used by the specific train in a journey).

User location 1301 refers to a received location point of the user by the server. In some embodiments, there can be multiple received user locations 1301 over a period of time.

Known data 1302 refers to a position of the means of transportation (e.g. bus, train, ferry, etc.) along the journey for a corresponding user location. In some embodiments, the position of the means of transportation is estimated using schedules and known delays, or an actual position if available. As shown in FIG. 13, the user location 1301 can vary from known data 1302.

Deviation between user location and known data 1303 represents the distance between the user and the means of transportation. Deviation 1303 is a measure of deviation between the observed locations and expected schedule. The larger that value, the less likely the journey being analyzed is the right one. For example, if the user is on train A then the distance to the expected position of train A will be close to 0. However, if the user was actually on train B running 10 minutes later, then the distance to train A become 10 minutes*speed of train (60 mph for example) which corresponds to a distance of 10 miles.

FIG. 14 is a flowchart showing a process of passive payments, according to some embodiments of the present disclosure.

Referring to step 1400, data is received from a user. The data includes information about a user's location at various points in time. In some embodiments, the data is received at a predefined time interval (e.g., once every second, once every minute). In some embodiments, the frequency at which user data is received can be correlated with a user parameter (e.g., user speed, location). For example, user data may be received with greater frequency when the system detects that the user is traveling at a greater speed. User data can also be received with greater frequency when the system detects that a user is approaching a venue associated with an event that the user may be attending (e.g., movie theater, concert).

Referring to step 1401, relevant activities are extracted. User data is processed to identify relevant activities, including labeled journeys (e.g. a train ride, a ferry ride) and visits (e.g. time spent at an amusement park, at a zoo). The stream of location points and data of various kind provided by the device is fed into a machine-learning model that breaks the stream into segments that correspond to a contiguous single-activity block and identifies them with an appropriate label (e.g. train, car, walk, etc.).

Referring to step 1402, a context (also referred to herein as "instance") of the activity is identified. The system described herein can identify the context of an activity, such as the exact train taken (train number X from station A to station B at time T) or venue visited (establishment Y from time T1 to time T2). The system described herein can take a labeled single-activity segment and can use the data of the transport network associated with it (e.g. rail providers, transit authorities, other users, real-time sources, etc.) to make an assessment.

Referring to step 1403, a payment is processed. A payment is processed as needed based on the type and context of the activity. For example, a payment is processed when a user is actually on a train requiring a ticket for travel, but not when the user is driving along a train track. In some embodiments, a payment is only processed when the payment associated with an instance of the activity is greater than zero.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, (e.g., EPROM, EEPROM, and flash memory devices); magnetic disks, (e.g., internal hard disks or removable disks); magneto optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The subject matter described herein can be implemented in a computing system that includes a back end component (e.g., a data server), a middleware component (e.g., an application server), or a front end component (e.g., a client computer having a graphical user interface or a web browser through which a user can interact with an implementation of the subject matter described herein), or any combination of such back end, middleware, and front end components. The components of the system can be interconnected by any form or medium of digital data communication, e.g., a communication network. Examples of communication networks include a local area network ("LAN") and a wide area network ("WAN"), e.g., the Internet.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter, which is limited only by the claims which follow.

The invention claimed is:

1. A computerized method of ticketing, the computerized method comprising:
receiving, by a computing device, from a user device comprising a battery, via a network, cached user data;
wherein the user device is located on a train, the user device hosting an application that records location information and communicates the location information to the computing device; and
wherein the cached user data includes a plurality of user location points and a time associated with each of the plurality of user location points, and the cached user data is received in response to at least one of the user device saving on battery usage or a poor network connection preventing the computing device from receiving real-time user data;
retrieving, by the computing device, transportation link information from a geographic information system (GIS) provider, the transportation link information identifying a location of at least one train track and at least one road;
determining, by the computing device, a first distance between each of the plurality of user location points and each of the at least one train track, yielding a plurality of first distances;
determining, by the computing device, a second distance between each of the plurality of user location points and each of the at least one road, yielding a plurality of second distances;
predicting, by the computing device, that the user is riding a train based on the plurality of first distances, the plurality of second distances, and past activities of the user;
filtering, by the computing device, for known artifacts among the plurality of user location points, the known artifacts being associated with the cached user data surfacing erroneous locations;
identifying, by the computing device, based on the filtered plurality of user location points, an instance of the train that the user is traveling on;
determining that the instance of the train is billable; and
requesting, by the computing device, a payment amount for the user based on the billable instance of the train.

2. The computerized method of claim 1, wherein predicting that the user is traveling by train further comprises:
extracting, by the computing device, metadata from the user data for each location point;
tagging, by the computing device, the metadata with information relevant to a mode of transportation to form a collection of features describing the metadata; and
associating, by the computing device, each of the location points with transportation information based on the collection of features describing the metadata.

3. The computerized method of claim 1, wherein determining an instance of the train further comprises:
comparing, by the computing device, the user data with at least one of location information associated with the instance of the train and timing information associated with the instance of the train.

4. The computerized method of claim 3, further comprising receiving, by the computing device, the at least one of the location information and the timing information associated with the instance of the train from a database external to the computing device.

5. The computerized method of claim 1, further comprising determining at least one of:
a location point associated with a start time of the user riding the train,
a location point associated with an end time associated with the user riding the train, and
a number and identity of location points associated with a duration of the user riding the train.

6. The computerized method of claim 1, wherein predicting that the user is riding the train includes comparing a probability that the user riding the train to a probability that the user is engaged in one or more other activities comprising at least one of:
watching a movie;
attending a concert;
parking in a parking garage;
riding at least one of a bus or a ferry; or
driving through a toll booth.

7. The computerized method of claim 4, wherein the instance of the train includes a time associated with the identified instance, and an identification of one train of a plurality of trains associated with the user riding on the train.

8. The computerized method of claim 1, wherein the payment amount is greater than zero when the instance of the train is associated with a cost for riding the instance of the train.

9. The computerized method of claim 1, further comprising transmitting information associated with the payment to a user device associated with the user.

10. A computing system for train ticketing comprising:
data storage; and
a processor in communication with the data storage, and configured to run a module stored in memory that is configured to cause the processor to:
receive, from a user device comprising a battery, via a network, cached user data;

wherein the user device is located on a train, the user device hosting an application that records location information and communicates the location information to the computing device; and wherein the cached user data includes a plurality of user location points and a time associated with each of the plurality of user location points, and the cached user data is received in response to at least one of the user device saving on battery usage or a poor network connection preventing the computing device from receiving real-time user data;

retrieve transportation link information from a geographic information system (GIS) provider, the transportation link information identifying a location of at least one train track and at least one road;

determine a first distance between each of the plurality of user location points and each of the at least one train track, yielding a plurality of first distances;

determine a second distance between each of the plurality of user location points and each of the at least one road, yielding a plurality of second distances predict that the user is riding a train based on the plurality of first distances, the plurality of second distances, and past activities of the users;

filter for known artifacts among the plurality of user location points, the known artifacts being associated with the cached user data surfacing erroneous locations;

identify, based on the filtered plurality of user location points, an instance of the train that the user is traveling on;

determine that the instance of the train is billable; and process a payment amount for the user based on the billable instance of the train.

11. The computing system of claim 10, wherein the processor is further caused to:

extract metadata from the user data for each location point;

tag the metadata with information relevant to a mode of transportation to form a collection of features describing the metadata; and associate each of the location points with transportation information based on the collection of features describing the metadata.

12. The computing system of claim 10, wherein to determine an instance of the train, the processor is further caused to:

compare the user data with at least one of location information associated with the instance of the train and timing information associated with the instance of the train.

13. The computing system of claim 12, wherein the processor is further caused to receive by the at least one of the location information and the timing information associated with the instance of the train from a database external to the computing system.

14. The computing system of claim 10, wherein the processor is further caused to determine at least one of:

a location point associated with a start time of the user riding the train, a location point associated with an end time associated with the user riding the train, and a number and identity of location points associated with a duration of the user riding the train.

15. The computing system of claim 10, wherein predicting that the user is riding the train includes comparing a probability that the user riding the train to a probability that the user is engaged in one or more other activities comprising at least one of:

watching a movie;

attending a concert;

parking in a parking garage;

riding at least one of a bus or a ferry; or driving through a toll booth.

16. The computing system of claim 15, wherein the instance of the train includes a time associated with the identified instance, and an identification of one train of a plurality of trains associated with the user riding on the train.

17. The computing system of claim 10, wherein the payment amount is greater than zero when the instance of the train is associated with a cost for riding the instance of the train.

18. The computing system of claim 10, wherein the processor is further caused to transmit information associated with the payment to a user device associated with the user.

19. A non-transitory computer readable medium having executable instructions operable to cause an apparatus to:

receive, from a user device comprising a battery, via a network, cached user data;

wherein the user device is located on a train, the user device hosting an application that records location information and communicates the location information to the computing device; and wherein the cached user data includes a plurality of user location points and a time associated with each of the plurality of user location points, and the cached user data is received in response to at least one of the user device saving on battery usage or a poor network connection preventing the computing device from receiving real-time user data;

retrieve transportation link information from a geographic information system (GIS) provider, the transportation link information identifying a location of at least one train track and at least one road;

determine a first distance between each of the plurality of user location points and each of the at least one train track, yielding a plurality of first distances;

determine a second distance between each of the plurality of user location points and each of the at least one road, yielding a plurality of second distances predict that the user is riding a train based on the plurality of first distances, the plurality of second distances, and past activities of the users;

filter for known artifacts among the plurality of user location points, the known artifacts being associated with the cached user data surfacing erroneous locations;

identify, based on the filtered plurality of user location points, an instance of the train that the user is traveling on;

determine that the instance of the train is billable; and process a payment amount for the user based on the billable instance of the train.

20. The non-transitory computer readable medium of claim 19, wherein the apparatus is further caused to:

extract metadata from the user data for each location point;

tag the metadata with information relevant to a mode of transportation to form a collection of features describing the metadata; and associate each of the location points with transportation information based on the collection of features describing the metadata.

\* \* \* \* \*